United States Patent
Anzai

(10) Patent No.: US 6,522,659 B2
(45) Date of Patent: Feb. 18, 2003

(54) TDMA VOICE INFORMATION READING APPARATUS

(75) Inventor: Takeshi Anzai, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/095,568

(22) Filed: Jun. 11, 1998

(65) Prior Publication Data

US 2002/0021709 A1 Feb. 21, 2002

(30) Foreign Application Priority Data

Jun. 16, 1997 (JP) .............................. 9-158171

(51) Int. Cl.$^7$ ................................................. H04J 3/06
(52) U.S. Cl. ..................... 370/442; 370/503; 370/509
(58) Field of Search ................................. 370/435, 442, 370/498, 503, 509, 514, 520

(56) References Cited

U.S. PATENT DOCUMENTS

| | | | | |
|---|---|---|---|---|
| 3,760,106 A | * | 9/1973 | Monti .................... | 179/15 BA |
| 3,988,674 A | * | 10/1976 | Sciolli .................... | 179/15 BS |
| 4,052,670 A | * | 10/1977 | Watanabe et al. .......... | 370/324 |
| 4,281,218 A | * | 7/1981 | Chuang .................... | 179/1 SC |
| 4,365,112 A | * | 12/1982 | Ruether .................... | 179/1 SC |
| 4,562,571 A | * | 12/1985 | Deman .................... | 370/7 |
| 4,740,962 A | | 4/1988 | Kish, III | |
| 4,755,993 A | | 7/1988 | Grover | |
| 4,852,090 A | | 7/1989 | Borth | |
| 5,140,618 A | * | 8/1992 | Kinoshita et al. .......... | 375/368 |
| 5,177,740 A | | 1/1993 | Toy et al. | |
| 5,255,264 A | * | 10/1993 | Cotton et al. .............. | 370/286 |
| 5,257,265 A | | 10/1993 | Su et al. | |
| 5,440,265 A | | 8/1995 | Cochran et al. | |
| 5,636,208 A | * | 6/1997 | Chang et al. .............. | 370/347 |
| 5,668,813 A | * | 9/1997 | Malek et al. .............. | 370/514 |
| 5,708,704 A | * | 1/1998 | Fishaer ...................... | 379/410 |

FOREIGN PATENT DOCUMENTS

| | | |
|---|---|---|
| JP | 1-500950 | 3/1989 |
| JP | 4-10725 | 4/1990 |
| JP | 4-10725 | 1/1992 |
| JP | 5-227136 | 9/1993 |

OTHER PUBLICATIONS

European Search Report dated Jul. 6, 2001.

\* cited by examiner

*Primary Examiner*—Alpus H. Hsu
*Assistant Examiner*—Roberta Stevens
(74) *Attorney, Agent, or Firm*—McGinn & Gibb, PLLC

(57) ABSTRACT

A TDMA voice information reading apparatus is constituted by two shift registers, a synchronous detection circuit, a selector, an AND gate, a TCH data read window generation circuit, and a clock signal generation circuit. The apparatus includes a processing circuit unit for, when reception data based on time division multiple access is received with a pull-out, delaying the reception data with the pull-out and detecting synchronization before the data is read out, and then reading out voice data and outputting the voice data.

19 Claims, 4 Drawing Sheets

FIG.1
PRIOR ART
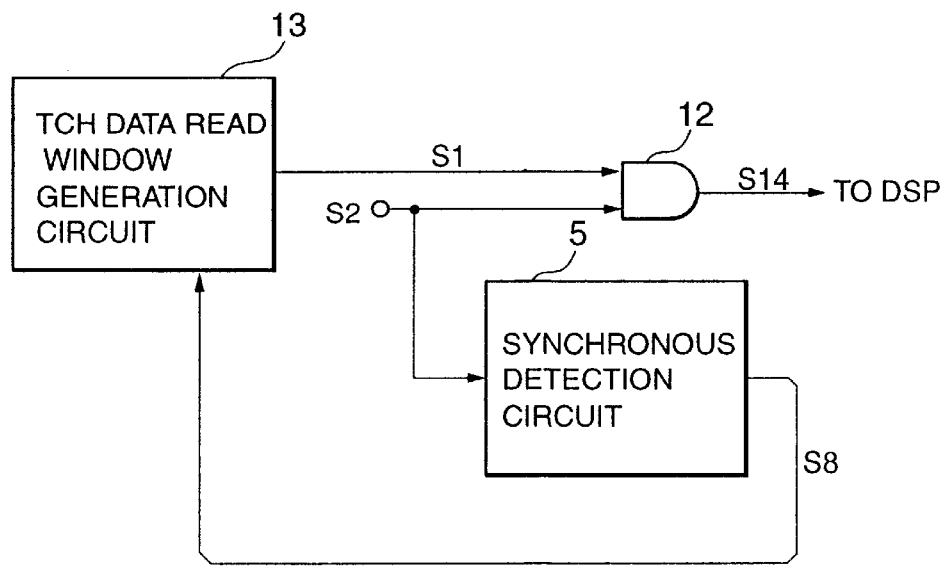
FIG.2A PRIOR ART
FIG.2B PRIOR ART
FIG.2C PRIOR ART
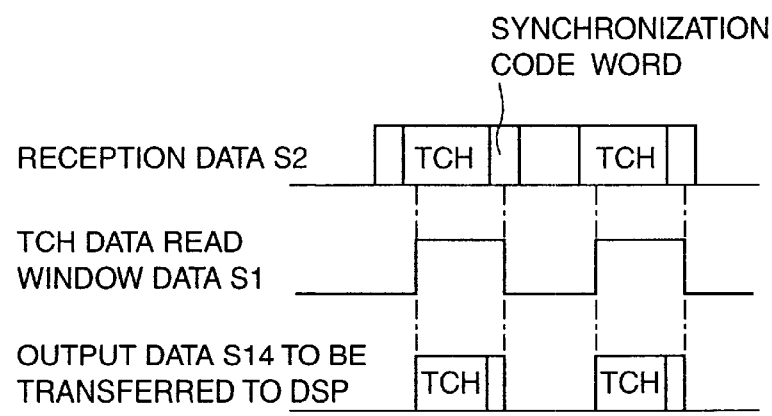

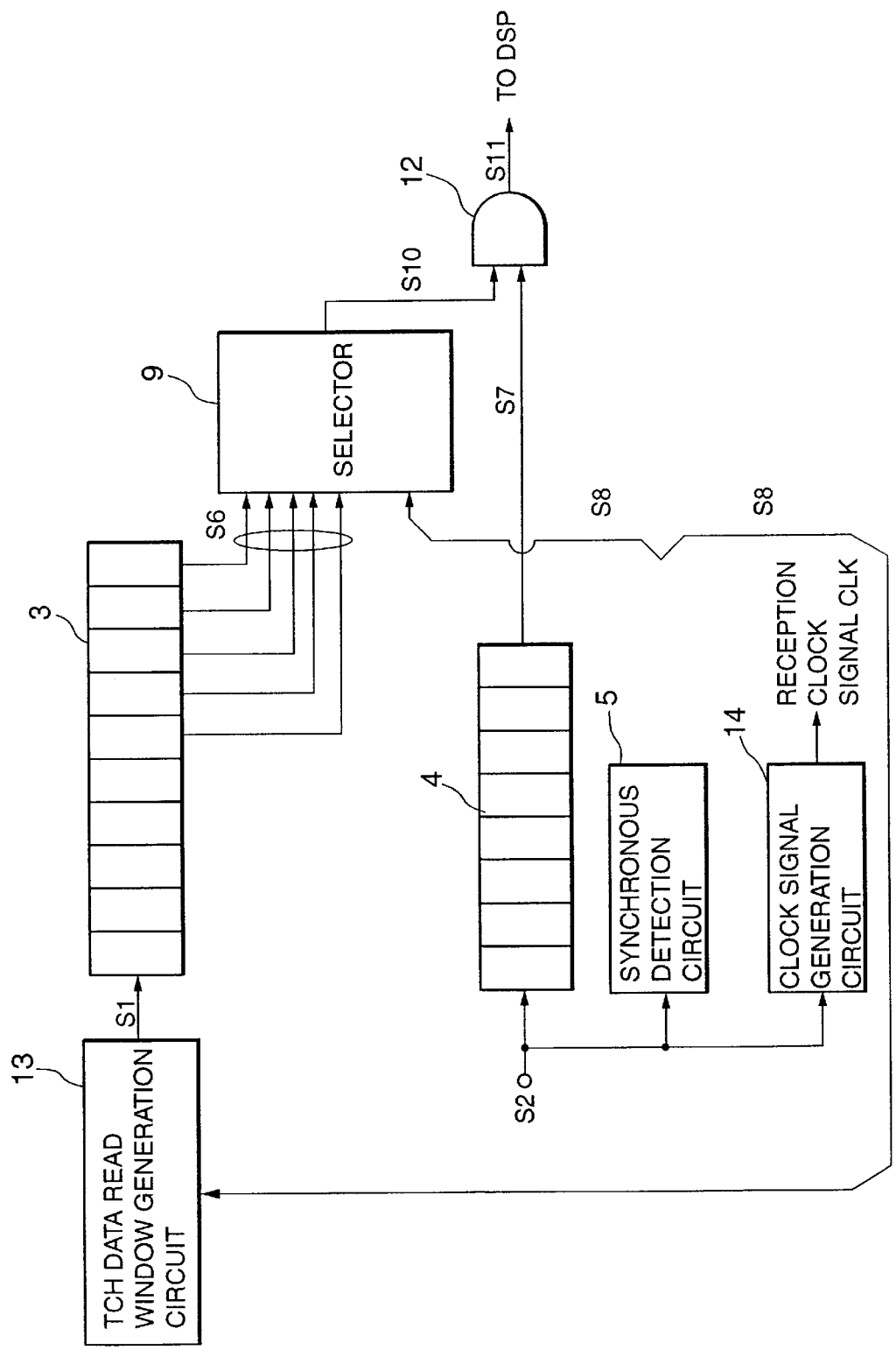

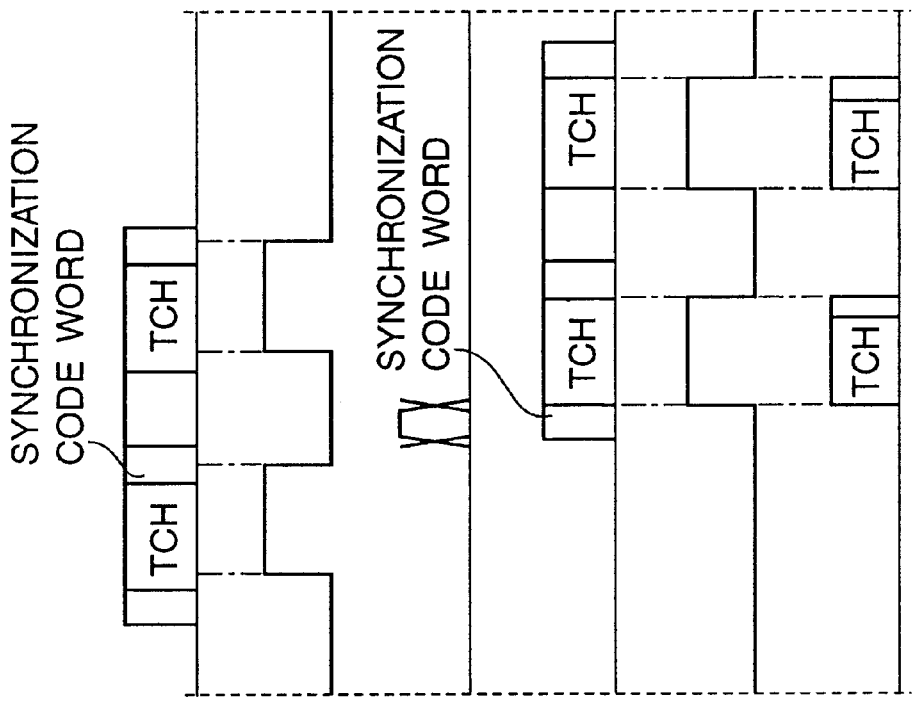
FIG.4A  RECEPTION DATA S2
FIG.4B  TCH DATA READ WINDOW DATA S1
FIG.4C  BIT SHIFT DATA S8 (SELECTOR CONTROL SIGNAL) REPRESENTING SHIFT FROM PRESCRIBED TIMING
FIG.4D  RECEPTION DATA S7 DELAYED UNTIL SYNCHRONOUS DETECTION IS COMPLETE
FIG.4E  TCH DATA READ WINDOW DATA S6 SYNCHRONIZED WITH TCH DATA IN RECEPTION DATA S2
FIG.4F  VOICE OUTPUT DATA S11 TO DSP

TDMA VOICE INFORMATION READING APPARATUS

BACKGROUND OF THE INVENTION

1. Field of the Invention

The present invention relates to a time division multiple access (TDMA) voice information reading apparatus for reading out voice data from data received by TDMA and, more particularly, to a TDMA voice information reading apparatus which delays voice data until synchronous detection even upon receipt of out of frame reception data (e.g., a pull-out of reception data) in a transmission line such as a radio channel, thereby normally reading out the voice data and outputting it.

2. Description of the Prior Art

Conventionally, a TDMA voice information reading apparatus of this type is applied to, e.g., a portable telephone. In this case, the timing of reception data sometimes shifts from the original timing due to the distance from a cell base station connected via a radio channel or multiple radio wave propagation (multipath) at an obstacle at the moving position. That is, voice data out of phase may be received.

A "bit synchronization circuit" disclosed in Japanese Unexamined Patent Publication No. 4-10725 is known as a measure against such reception data out of phase. In this prior art, when a pull-out occurs, erroneous data is not read out from the FIFO memory. That is, the data out of phase is discarded.

FIG. 1 is a block diagram showing the arrangement of main part (TCH (Traffic Channel) read circuit) of a conventional TDMA voice information reading apparatus. Referring to FIG. 1, the TCH read circuit has a TCH data read window generation circuit 13 for generating TCH data read window data S1 of high level at a free-running timing. The TCH read circuit also has an AND gate 12 for receiving the TCH data read window data Si and reception data S2 and outputting voice output data S14 to a digital signal processor (DSP) (not shown) for processing speech communication voice data, and a synchronous detection circuit 5 for detecting synchronization from the reception data S2 and sending bit shift data S8 representing the shift of the reception data S2 from the prescribed timing to the TCH data read window generation circuit 13.

FIGS. 2A to 2C are process timing charts showing the operation of the conventional TDMA voice information reading apparatus. In FIGS. 1 and 2A to 2C, the standards of a digital mobile telephone system to which the TCH read circuit in the TDMA voice information reading apparatus is applied are defined on the basis of "RCR-27D". In this system, a synchronization code word for synchronous detection is set in a reception slot, as shown in FIG. 2A.

The TCH data read window data S1 of high level is generated by the TCH data read window generation circuit 13 at a free-running timing as shown in FIG. 2B and input to one input terminal of the AND gate 12. The reception data S2 is input to the other input terminal of the AND gate 12 and the synchronous detection circuit 5. The synchronous detection circuit 5 detects the bit shift data S8 representing the shift of the reception data 52 from the prescribed timing and outputs the bit shift data S8 to the TCH data read window generation circuit 13.

When the synchronous detection circuit 5 detects the bit shift, an erroneous data portion in the reception data has already been output from the AND gate 12 to the DSP as TCH data or the voice output data S14. In this case, the DSP cannot perform normal voice data processing. As a result, the TCH data of the current slot cannot be processed as normal voice data although the synchronous timing of the next slot can be calculated from the bit shift data obtained from the current slot. Therefore, the channel quality degrades.

As described above, in the conventional TDMA voice information reading apparatus, TCH data of the current slot cannot be processed as normal voice data although the synchronous timing of the next slot can be calculated from the bit shift data obtained from the current slot. Therefore, the channel quality degrades to result in a low transmission efficiency and low reliability of data transmission.

SUMMARY OF THE INVENTION

The present invention has been made in consideration of the above situation of the prior art, and has as its object to provide a TDMA voice information reading apparatus which can normally output TCH data of a current slot as voice data even when data based on time division multiple access is received with a pull-out due to degradation in channel quality, thereby largely improving the transmission efficiency and reliability of transmission.

A TDMA voice information reading apparatus of the present invention comprises processing means for, in a pull-out of reception data based on time division multiple access, delaying the reception data pulling out synchronization and detecting synchronization before the reception data is read out, and then reading out voice data and outputting the voice data in order to normally read out and output the voice data.

In the TDMA voice information reading apparatus of the present invention, a delay time until the reception data is read out is a minimum time for synchronous detection.

In the present invention, phase matching of a read signal associated with a timing at which the voice data in the reception data is read out is adjusted by delaying the read signal or reception data in units of bits.

In order to achieve the above object, according to the first aspect of the present invention, there is provided a TDMA voice information reading apparatus comprising:

(a) a first shift register for storing, in units of bits, window data used to read out the voice data in the reception data, reading out the window data, and outputting the window data;

(b) a second shift register for storing reception data of a slot in units of bits and outputting the reception data with a timing shift of several bits before or after a synchronization code word stored in a reception slot on the basis of the reception data received at a prescribed timing;

(c) a synchronous detection circuit for comparing, in units of slots, a reception timing of the synchronization code word in the reception data with a free-running pulse internally generated at a prescribed timing and outputting bit shift data representing a phase shift of the timing;

(d) an AND gate for sending voice output data obtained by ANDing read window data phase-matching the voice data in the reception data and reception data delayed until establishment of synchronization, which is output from the second shift register;

(e) a selector for selecting the read window data and outputting the read window data phase-matching the voice data in the reception data on the basis of the bit shift data representing the position and the number of bits shifted from the prescribed timing, which is output from the synchronous detection circuit after reception of the synchronization code word in the slot; and (f) a voice data read window generation circuit for generating the read window data at a free-running timing allowing reception of a synchronization code word in the next slot after reception of the synchronization code word in the preceding slot.

In order to achieve the above object, according to the second aspect of the present invention, there is provided a TDMA voice information reading apparatus comprising:

(a) a voice data read window generation circuit for generating read window data at a free-running timing allowing reception of a synchronization code word in the next slot after reception of a synchronization code word in a preceding slot;

(b) a first shift register for delaying the read window data from the voice data read window generation circuit in units of bits and outputting the read window data;

(c) a second shift register for storing reception data in units of bits and outputting delayed reception data;

(d) a synchronous detection circuit for comparing, in units of slots, a reception timing of the synchronization code word in the reception data with a free-running pulse internally generated at a prescribed timing and outputting bit shift data representing a phase shift of the timing;

(e) a selector for selecting the read window data from the second shift register, which is delayed by the second shift register, on the basis of the bit shift data representing the position and the number of bits shifted from the prescribed timing, which is output from the synchronous detection circuit after reception of the synchronization code word in the slot, and outputting the reception data; and (f) an AND gate for sending voice output data obtained by ANDing read window data phase-matching the voice data in the reception data and reception data delayed until establishment of synchronization, which is output from the first shift register.

As is apparent from the above-described arrangements, the TDMA voice information reading apparatus of the present invention can output normal voice data from the current slot even when the reception data based on time division multiple access pulls out synchronization due to degradation in channel quality, so the transmission efficiency and reliability of transmission are largely improved.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIG. 1 is a block diagram showing the arrangement of main part (TCH read circuit) of a conventional TDMA voice information reading apparatus;

FIGS. 2A to 2C are process timing charts associated with the operation of the prior art;

FIG. 3 is a block diagram showing the arrangement of main part (TCH read circuit) of a TDMA voice information reading apparatus according to an embodiment of the present invention;

FIGS. 4A to 4F are timing charts showing data processing associated with the operation of the embodiment shown in FIG. 3.

DETAILED DESCRIPTION OF THE PREFERRED EMBODIMENTS

Figure 5:
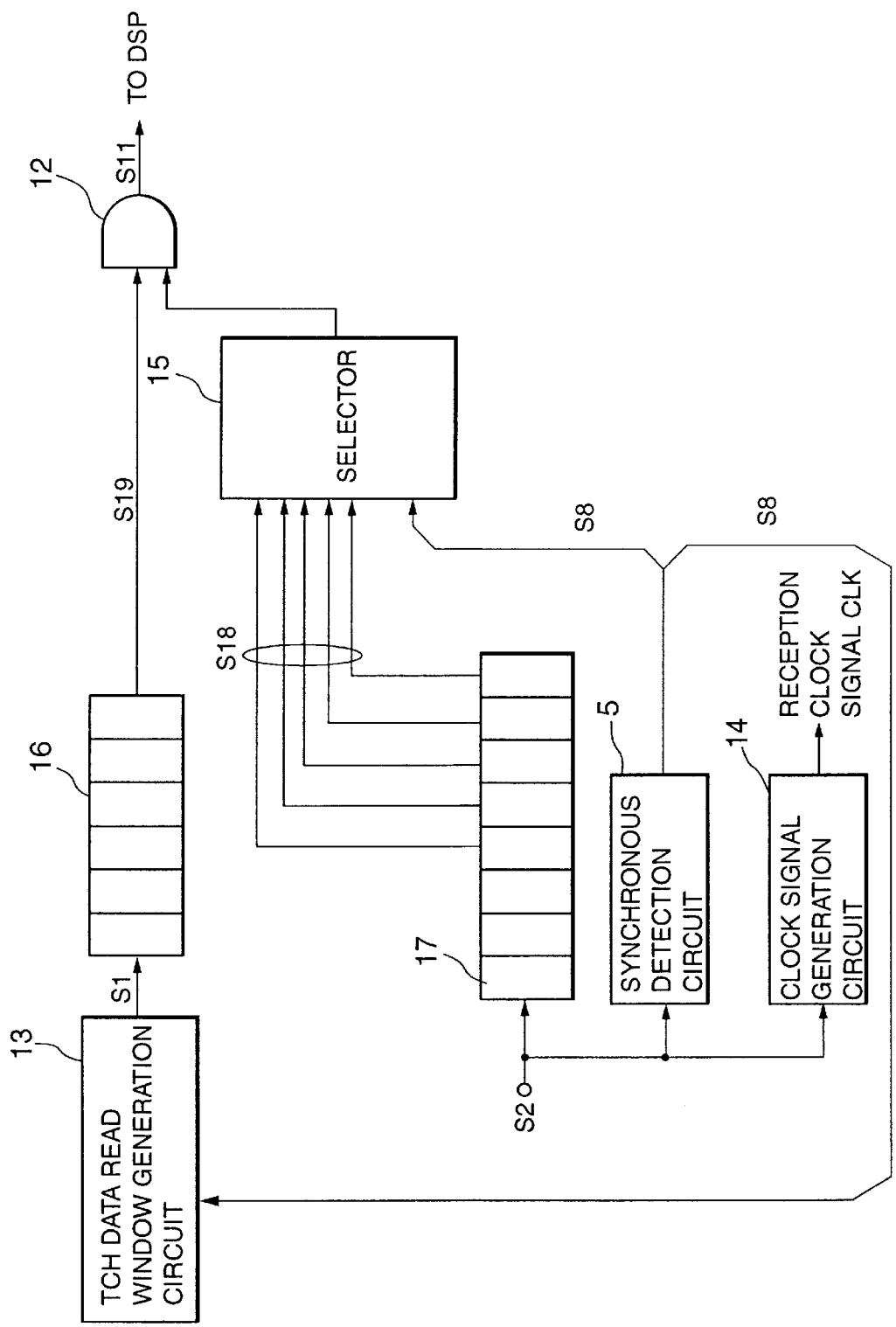
FIG. 5 is a block diagram showing the arrangement of main part (TCH read circuit) of a TDMA voice information reading apparatus according to another embodiment of the present invention.

Preferred embodiments of the present invention will be described below in detail with reference to the accompanying drawings.

FIG. 3 is a block diagram showing the circuit arrangement of a TDMA voice information reading apparatus according to an embodiment of the present invention. The TDMA voice information reading apparatus shown in FIG. 3 has a shift register 3 serving as a FIFO buffer operated by a reception clock signal CLK. The shift register 3 stores TCH data read window data Si in units of bits, which is set at high level only in correspondence with the timing of TCH data, i.e., a voice data portion in reception data S2, and outputs TCH data read window data S6.

The TDMA voice information reading apparatus also has a shift register 4 serving as a FIFO buffer operated by the reception clock signal CLK generated from the reception data S2. The shift register 4 stores the reception data S2 of one slot in units of bits, as needed, and outputs reception data S7 whose timing is shifted by several bits before or after a synchronization code word stored in a reception slot on the basis of the reception data S2 received at a prescribed timing (20 mS in RCR-27D).

This TDMA voice information reading apparatus also has a synchronous detection circuit 5 which compares, in units of slots, the reception timing of the synchronization code word in the reception data S2 with the free-running pulse internally generated at a prescribed timing and outputs bit shift data S8 representing that the reception data S2 is shifted in units of bits, and an AND gate 12 for sending, to a digital signal processor (DSP) for processing speech communication voice data, voice output data S11 containing only a normal TCH data portion extracted by ANDing TCH data read window data S10 phase-matching the TCH data in the reception data S2 and the reception data S7 from the shift register 4, which is delayed until establishment of synchronization.

The TDMA voice information reading apparatus also has a selector 9 which selects TCH data read window data S6 from the shift register 3 on the basis of the bit shift data S8 representing the position and the number of bits shifted from the prescribed timing, which is output from the synchronous detection circuit 5 after reception of the synchronization code word in the slot, and outputs the TCH data read window data S10 phase-matching the TCH data in the reception data S2.

The TDMA voice information reading apparatus also has a TCH data read window generation circuit 13 for generating the TCH data read window data Si at a free-running timing allowing reception of the synchronization code word in the next slot after 20 mS from reception of the synchronization code word in the preceding slot, and a clock signal generation circuit 14 for sending the reception clock signal CLK generated from the reception data S2 to various portions.

The operation of this embodiment will be described next.

FIGS. 4A to 4F are timing charts of data processing in the operation of this embodiment. In FIGS. 3 and 4A to 4F, the reception data S2 is input to the shift register 4. The shift register 4 serves as a FIFO buffer operated by the reception clock signal CLK generated from the reception data S2 and stores the reception data S2 of a slot in units of bits, as needed. The shift register 4 outputs the reception data with a shift of several bits forward or backward on the basis of the reception data S2 received at the prescribed timing (20 mS in RCR-27D). This output is made after reception of the synchronization code word stored in the reception slot.

The shift register 3 serves as a FIFO buffer operated by the reception clock signal CLK and stores the TCH data read window data S1 generated by the TCH data read window generation circuit 13 at a timing shown in FIG. 4B in units of bits. This TCH data read window data S1 is data of high level, which is internally generated at a free-running timing. The TCH data read window data S1 of high level, which corresponds to only the timing of the TCH data, i.e., the voice data portion in the reception data S2, is output to the AND gate 12 together with the reception data S2 passing through the shift register 4.

The voice output data S11 shown in FIG. 4F is sent from the AND gate 12 to a DSP (not shown) for processing speech communication voice data as serial data. The timing at which the TCH data read window data Si of high level is output from the TCH data read window generation circuit 13 in correspondence with TCH data is calculated on the basis of the bit shift data S8 representing a shift from the pre-scribed timing of the preceding output, which is output from the synchronous detection circuit 5 at a timing shown in FIG. 4C.

To cope with the generated bit shift, the shift register 3 sends the TCH data read window data S6 having a phase shift of several bits forward or backward, as shown in FIG. 4E, to the selector 9 in units of bits on the basis of reception at the prescribed timing. The synchronous detection circuit 5 compares, in units of slots, the reception timing of the synchronization code word in the reception data S2 shown in FIG. 4A with the free-running pulse internally generated at a prescribed timing because the synchronization code word in the next slot is received after 20 mS from the reception timing of the synchronization code word in the preceding reception data S2, as defined in RCR-27D, and outputs the bit shift data S8 representing the phase shift of this timing. Since the reception data S2 is synchronized with the reception clock, the timing is phase-shifted in units of bits of the reception data S2. The TCH data read window generation circuit 13 generates the TCH data read window data S1 at a free-running timing allowing reception of the synchronization code word in the next slot after 20 mS from reception of the synchronization code word in the preceding slot. The selector 9 selects the TCH data read window data S1 and outputs the TCH data read window data S10 phase-matching the TCH data in the reception data S2 on the basis of the bit shift data S8 representing the position and the number of bits shifted from the prescribed timing, which is output from the synchronous detection circuit 5 after reception of the synchronization code word in the slot.

The TCH data read window data S10 phase-matching the TCH data in the reception data S2 and the reception data S7 from the shift register 4 shown in FIG. 2D, which is delayed until synchronization establishment, are input to the AND gate 12. These data are ANDed, and the voice output data S11 containing only a normal TCH data portion is output.

FIG. 5 is a block diagram showing the arrangement of another embodiment of the present invention. The TDMA voice information reading apparatus of this embodiment in FIG. 5 has a TCH data read window generation circuit 13 for generating TCH data read window data Si at a free-running timing allowing reception of the synchronization code word in the next slot after 20 mS from reception of the synchronization code word in the preceding slot.

The TDMA voice information reading apparatus also has a shift register 16 serving as a FIFO buffer operated by a reception clock signal CLK. The shift register 16 outputs TCH data read window data S19 by delaying the TCH data read window data S1 in units of bits. The apparatus also has a shift register 17 serving as a FIFO buffer operated by the reception clock signal CLK. The shift register 7 outputs reception data S18 by storing and delaying reception data S2 in units of bits.

The TDMA voice information reading apparatus also has a synchronous detection circuit 5 which compares, in units of slots, the reception timing of the synchronization code word in the reception data S2 with the free-running pulse internally generated at a prescribed timing and outputs bit shift data S8 representing the phase shift of the timing corresponding to the reception data S2 shifted in units of bits.

The TDMA voice information reading apparatus also has a selector 15 which selects the reception data S18 from the shift register 17, which is delayed by the shift register 17, on the basis of the bit shift data S8 representing the direction and the number of bits shifted from the prescribed timing, which is output from the synchronous detection circuit 5 after reception of the synchronization code word in the slot, and outputs the reception data (S2).

The TDMA voice information reading apparatus also has an AND gate 12 for sending, to a DSP for processing speech communication voice data, voice output data S11 containing only a normal TCH data portion obtained by ANDing the TCH data read window data S19 phase-matching the TCH data in the reception data S2 and the reception data (S2) from the shift register 17, which is delayed until establishment of synchronization, and a clock signal generation circuit 14 for sending the reception clock signal CLK generated from the reception data S2 to various portions.

The operation of this embodiment will be described next.

The reception data S2 is stored in the shift register 17 in units of bits. The delayed reception data S18 is output to the selector 15. The selector 15 selects the reception data S18 delayed by the shift register 17, on the basis of the bit shift data S8 representing a shift from the prescribed timing, which is output from the synchronous detection circuit 5 after reception of the synchronization code word, and outputs the reception data S18 to one input terminal of the AND gate 12. The TCH data read window data S1 generated by the TCH data read window generation circuit 13 is input to the shift register 16 in units of bits.

The shift register 16 stores the TCH data read window data S1 from the TCH data read window generation circuit 13 in units of bits. The TCH data read window data S19 delayed and read out is output to the other input terminal of the AND gate 12. The AND gate 12 outputs, to a DSP (not shown), the voice output data S11 containing only a normal voice data portion obtained by ANDing the TCH data read window data S19 from the shift register 16 and the reception data (S2) selected from the delayed reception data S18 by the selector 15.

The principle and two embodiments of the present invention described above can be suitably applied to a movable terminal in a digital mobile telephone system.

What is claimed is:

1. A TDMA voice information reading apparatus comprising processing means for, upon receipt of out of frame reception data based on time division multiple access, delaying a synchronization of out of frame reception data, detecting said synchronization before the reception data is read out, reading out synchronized voice data, and outputting the synchronized voice data, wherein said processing means comprises a first shift register for storing window data used to read out the voice data in the reception data and a second shift register for storing reception data of a slot and outputting the reception data with a timing shift before or after a synchronization code word stored in a reception slot on the basis of the reception data received at a prescribed timing.

2. The apparatus according to claim 1, wherein a delay time until said processing means reads out the reception data is a minimum time for synchronous detection.

3. The apparatus according to claim 1, wherein a phase matching of a read signal associated with a timing at which said processing means reads out the voice data in the reception data is adjusted by delaying the read signal in units of bits.

4. The apparatus according to claim 1, wherein a phase matching of a read signal associated with a timing at which said processing means reads out the voice data in the reception data is adjusted by delaying the reception data in units of bits.

5. A TDMA voice information reading apparatus for reading out voice data and outputting the voice data upon receipt of out of frame reception data based on time division multiple access, including processing means comprising:

a first shift register for storing, in units of bits, window data used to read out the voice data in the reception data, reading out the window data, and outputting the window data;

a second shift register for storing reception data of a slot in units of bits and outputting the reception data with a timing shift of several bits before or after a synchronization code word stored in a reception slot on the basis of the reception data received at a prescribed timing;

a synchronous detection circuit for comparing, in units of slots, a reception timing of the synchronization code word in the reception data with a free-running pulse internally generated at a prescribed timing and outputting bit shift data representing a phase shift of the timing;

an AND gate for sending voice output data obtained by ANDing read window data phase-matching the voice data in the reception data and reception data delayed until establishment of synchronization, which is output from said second shift register; a selector for selecting the read window data and outputting the read window data phase matching the voice data in the reception data on the basis of the bit shift data representing the position and the number of bits shifted from the prescribed timing, which is output from said synchronous detection circuit after reception of the synchronization code word in the slot; and a voice data read window generation circuit for generating the read window data at a free-running timing allowing reception of a synchronization code word in the next slot after reception of the synchronization code word in the preceding slot.

6. A TDMA voice information reading apparatus for reading out voice data and outputting the voice data upon receipt of out of frame reception data based on time division multiple access, including processing means comprising:

a voice data read window generation circuit for generating read window data at a free-running timing allowing reception of a synchronization code word in the next slot after reception of a synchronization code word in a preceding slot;

a first shift register for delaying the read window data from said voice data read window generation circuit in units of bits and outputting the read window data;

a second shift register for storing reception data in units of bits and outputting delayed reception data;

a synchronous detection circuit for comparing, in units of slots, a reception timing of the synchronization code word in the reception data with a free-running pulse internally generated at a prescribed timing and outputting bit shift data representing a phase shift of the timing;

a selector for selecting the read window data from said second shift register, which is delayed by said second shift register, on the basis of the bit shift data representing the position and the number of bits shifted from the prescribed timing, which is output from said synchronous detection circuit after reception of the synchronization code word in the slot, and outputting the reception data; and an AND gate for sending voice output data obtained by ANDing read window data phase-matching the voice data in the reception data and reception data delayed until establishment of synchronization, which is output from said first shift register.

7. The apparatus according to claim 1, wherein said processing means receives reception data based on time division multiple access, which has out of frame reception data generated in radio wave propagation in a transmission path of a radio channel.

8. The apparatus according to claim 1, wherein said processing means is applied to a movable terminal in a digital mobile telephone system.

9. The apparatus according to claim 5, wherein said processing means is applied to a movable terminal in a digital mobile telephone system.

10. The apparatus according to claim 6, wherein said processing means is applied to a movable terminal in a digital mobile telephone system.

11. The apparatus according to claim 1, wherein said processing means further comprises a data read window generation circuit for outputting data read window data at a free-running timing that is internally generated.

12. The apparatus according to claim 11, wherein said data read window generation circuit outputs said data read window data at a timing calculated with reference to bit shift data derived from the prescribed timing of a preceding output of said synchronous detection circuit.

13. The apparatus according to claim 3, wherein said delayed read signal is from said first register.

14. The apparatus according to claim 4, wherein said delayed reception data read signal is from said second register.

15. A TDMA voice information reading apparatus comprising:

a processor, wherein said processor, upon receipt of out of frame reception data based on time division multiple access, delays a synchronization of out of frame reception data, detects said synchronization before the reception data is read out, reads out synchronized voice data, and outputs the synchronized voice data, wherein a delay time until said processor reads out the reception data is a minimum time for synchronous detection, and wherein said processor includes a voice data read window generation circuit for generating the read window data at a free-running timing allowing reception of a synchronization code word in the next slot after reception of the synchronization code word in the preceding slot.

16. The apparatus according to claim 15, wherein a phase matching of a read signal associated with a timing at which said processor reads out the voice data in the reception data is adjusted by delaying the read signal in units of bits.

17. The apparatus according to claim 15, wherein a phase matching of a read signal associated with a timing at which said processor reads out the voice data in the reception data is adjusted by delaying the reception data in units of bits.

18. A TDMA voice information reading apparatus comprising:

a processor, wherein said processor, upon receipt of out of frame reception data based on time division multiple access, delays a synchronization of out of frame reception data, detects said synchronization before the reception data is read out, reads out synchronized voice data, and outputs the synchronized voice data, wherein a delay time until said processor reads out the reception data is a minimum time for synchronous detection, and wherein said processor includes a shift register for storing window data used to read out the voice data in the reception data, reading out the window data, and outputting the window data.

19. A TDMA voice information reading apparatus comprising:

a processor, wherein said processor, upon receipt of out of frame reception data based on time division multiple access, delays a synchronization of out of frame reception data, detects said synchronization before the reception data is read out, reads out synchronized voice data, and outputs the synchronized voice data, wherein a delay time until said processor reads out the reception data is a minimum time for synchronous detection, and wherein said processor includes a shift register for storing reception data of a slot and outputting the reception data with a timing shift before or after a synchronization code word stored in a reception slot on the basis of the reception data received at a prescribed timing.

* * * * *